Jan. 29, 1963  E. T. G. LIND  3,075,667
INSERT FOR VESSELS CONTAINING PILLS, TABLETS OR THE LIKE
Filed Dec. 31, 1959  2 Sheets-Sheet 1

INVENTOR
Evald T. G. Lind
BY Watson, Cole, Grindle & Watson
ATTORNEYS

Jan. 29, 1963 E. T. G. LIND 3,075,667
INSERT FOR VESSELS CONTAINING PILLS, TABLETS OR THE LIKE
Filed Dec. 31, 1959 2 Sheets-Sheet 2

INVENTOR
Evald T. G. Lind
BY Watson, Cole, Grindle & Watson
ATTORNEYS

United States Patent Office 3,075,667
Patented Jan. 29, 1963

---

3,075,667
INSERT FOR VESSELS CONTAINING PILLS, TABLETS OR THE LIKE
Evald Torbjörn Gustav Lind, Osterlanggatan 68B, Trollhattan, Sweden
Filed Dec. 31, 1959, Ser. No. 863,281
3 Claims. (Cl. 215—81)

To prevent tablets, pills, dragees and similar articles in jars or bottles or other vessels of glass or other material from rubbing against each other and from rattling in the jar, it has hitherto been usual to employ cotton wads which were torn manually from a supply of cotton and then stuffed into the jar so that the space therein between its contents and the cap was filled. This is an impractical, unhygienic and irrational means of preventing movement of the tablets etc. in the jar when this is moved or transported.

In my copending patent application Serial No. 818,587, filed on June 8, 1959, I have disclosed and claimed an insert for vessels for tablets, pills or the like, which is removably positioned in the vessel above its contents for the purpose referred to and which is so devised that it is free from the objections and disadvantages associated with the use of cotton wads.

The insert disclosed and claimed in the application referred to consists essentially of a star-shaped object made of a resilient material and comprising arms projecting from a central body, said arms being of such length relatively to the diameter of the vessel, that only after bending the arms against their resiliency the insert can be introduced into the vessel so that the central body engages the contents of the vessel and the bent arms extend toward the mouth of the vessel and are pressed against the inner wall of the vessel by their resiliency.

In one embodiment which is very advantageous the outer end portions of the arms are permanently bent or inclined from the main portion of the arms so that after introducing the insert into the vessel, the end portions are directed substantially toward each other. Thereby, the outer ends of the arms will not be jammed between the closure means and the mouth of the vessel. Preferably, the central portion of the insert is formed with a recess which serves to facilitate a central positioning of the insert on the vessel mouth before it is pushed into the vessel and if desired also to receive the end of a mandrel or similar member by means of which the insert is pushed into the vessel.

I have now found, however, that an insert of the kind disclosed and claimed in my copending patent application above referred to, although satisfactory in most cases, will not always entirely fulfill its intended purpose, because between the vessel wall and the lower portions of the arm, i.e. the portions adjacent the central body, there is formed a free space into which the pills or the like may be shaken up and may also in some cases find their way between the arms so that they get above the insert. Because of the bending of the arms, they will not contact the vessel contents in an annular zone adjacent the vessel wall.

The object of the present case is to eliminate this disadvantage.

In accordance with the present invention an insert for the purpose referred to comprises a star-shaped object made of a resilient material and comprising arms projecting from a central body, some of said arms being longer and of such length relatively to the diameter of the vessel, that only after bending the arms against their resiliency the insert can be introduced into the vessel so that the central body engages the contents of the vessel and the bent arms extend toward the mouth of the vessel and are pressed against the inner wall of the vessel by their resiliency, and the remaining arms being shorter and of such length that when the insert is positioned they extend to a point close to the vessel wall. The shorter arms will therefore lie substantially flat and will engage the vessel content substantially up to the vessel wall.

Preferably, there are several, e.g. two to four, shorter arms, between each pair of longer arms. Suitably, the shorter arms are of such shape, e.g. widening outwardly, that they substantially fill out the space between the longer arms.

In a preferred embodiment the longer arms are so shaped at a point, the distance from the center of which corresponds substantially to the length of the shorter arms, that they tend to be bent relatively sharply at said point, so that their inner portions will also tend to lie flat.

In other respects, the insert of the present invention may be formed in the same manner as the insert described in my copending application above referred to, the contents whereof will be included in this disclosure by way of reference thereto.

The invention will be described more in detail below with reference to the accompanying drawings, wherein.

Figure 1:
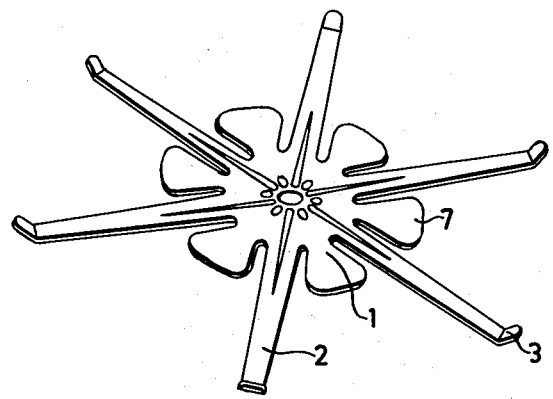
FIGURE 1 shows a perspective view of an insert according to one embodiment of this invention.
Figure 2:
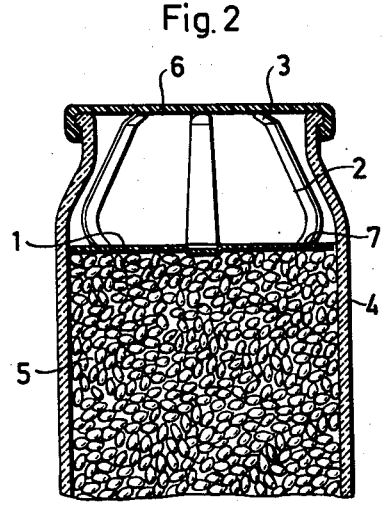
FIGURE 2 shows a cross-section of a vessel with the insert of FIGURE 1 positioned therein.

Referring to FIGURES 1 and 2, the insert shown therein which is suitably made from a soft-resilient plastic material such as, e.g., polyethylene, comprises a central body 1 from which there extend radially several (five in this example) longer arms 2 with bent outer end portions 3. These longer arms will be curved when the insert is positioned in the vessel 4, as seen from FIGURE 2, and are pressed by their resiliency against the inner wall of the vessel 4 when the central body 1 contacts the vessel contents 5. In that position the bent end portions 3 engage the vessel closure 6.

Extending radially from the central body 1 between the longer arms are shorter arms 7, the length of which is such that the diametral distance between the end points of two opposed shorter arms is equal to or slightly smaller than the internal diameter of the vessel. Thus, when the insert is positioned in the vessel, these arms 7 extend only to a point short of the vessel wall. Therefore, they will not be bent but will lie flat and engage the content across the width of the vessel, as seen in FIGURE 2.

Suitably these shorter arms 7 are of increasing width towards their outer ends, so that each shorter arm substantially fills the space between two longer arms 2. This largely eliminates the possibility of pills finding their way between the arms, since the central body 1, the shorter arms 7 and the inner portions of the longer arms 2 form a surface which is interrupted only by narrow slots and engages the contents.

Figure 3:
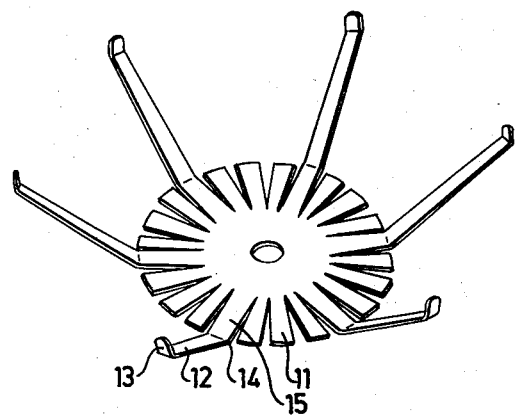
FIGURE 3 shows a perspective view of a second embodiment of the insert.
Figure 4:
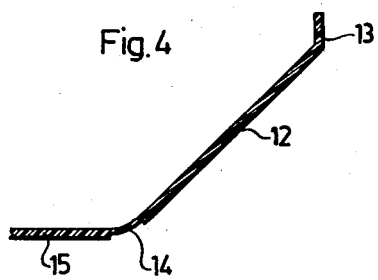
FIGURE 4 shows a longitudinal section of one of the longer arms of the insert of FIGURE 3.
Figure 5:
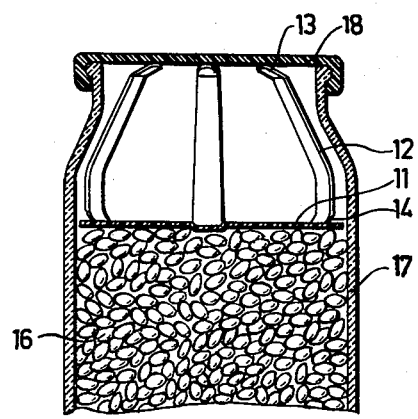
FIGURE 5 shows a vessel with an insert according to FIGURE 3.

The embodiment according to FIGURES 3-5 is an improvement over the embodiment just described and is therefore at present preferred. The insert shown in FIGURE 3 comprises six longer arms 12 with bent outer end portions 13 and between each two longer arms 12 three shorter arms 11 instead of the wide shorter arm 1 of FIGURE 1. These shorter arms are also widened outwardly, so that together they substantially fill the area between the longer arms 12. By using several shorter arms 11 instead of a single wide short arm, the shorter arms will obtain a greater degree of flexibility and will adapt themselves after the vessel content in a more satisfactory way.

The embodiment of FIGURES 3-5 also comprises means for ensuring that the inner portion of each longer arm 12 will lie substantially flat and at a level with the shorter arms 11. As seen most clearly in FIGURE 4 each longer arm 12 has a weakened portion 14. This causes the arms to tend to be bent relatively sharply at this point instead of being curved with a relatively great radius of curvature. Thus, the inner portion 15 of the longer arm will lie substantalily flat to the weakened portion 14. This portion is at a distance from the center of the insert which corresponds to the length of the shorter arms 11. This is seen in FIGURE 3 where the longer arms are shown bent at the points 14 to illustrate that the central portion of the insert will have substantially the shape of a flat disc even when the longer arms 12 are bent.

FIGURE 5 illustrates the insert of FIGURE 3 positioned above the contents 16 in a vessel 17 with closure 18.

I claim:

1. In combination with a vessel having a hollow interior for reception of pills and the like and a mouth communicating therewith, the width of said mouth being less than the width of said hollow interior; a generally star shaped unitary insert of resiliently flexible sheet material, said insert comprising a flat central body having a width less than the vessel mouth, a series of short arms radiating from said central body in the plane thereof, the outer ends of said arms being substantially coincident with the cross sectional boundary of said hollow interior, a further series of relatively spaced long arms radiating from said central body, said long arms having inner portions substantially in the same plane with said short arms; said long arms projecting from said central body considerably further than said short arms and having outer portions inwardly and upwardly deflected by the confining action of said vessel, all of said arms being adapted to flex during passage of the insert through said mouth, said short arms being interposed between adjoining long arms, and detached from said long arms to be substantially unaffected by said deflection of the long arms, said short arms and said inner portions of the long arms jointly occupying substantially the entire cross sectional area of said hollow interior to prevent movement of the vessel contents therepast.

2. An insert as in claim 1 in which there are several shorter arms between each two longer arms.

3. An insert as in claim 1 in which the longer arms are formed such that on positioning of the insert in the vessel, they tend to be bent relatively sharply at a point the distance of which to the center of the insert corresponds to the length of the shorter arms.

References Cited in the file of this patent

UNITED STATES PATENTS 1,342,321     Beler ------------------ June 1, 1920

FOREIGN PATENTS 552,616     Italy ------------------ Dec. 10, 1956